United States Patent [19]

Markman

[11] Patent Number: 4,550,246
[45] Date of Patent: Oct. 29, 1985

[54] INVENTORY CONTROL AND REPORTING SYSTEM FOR DRYCLEANING STORES

[76] Inventor: Herbert Markman, 631 Fariston Dr., Wynnewood, Pa. 19096

[21] Appl. No.: 599,948

[22] Filed: Apr. 13, 1984

[51] Int. Cl.⁴ .......................................... G06R 15/24
[52] U.S. Cl. ................................ 235/385; 235/383; 235/487
[58] Field of Search ............... 235/385, 375, 383, 487

[56] References Cited

U.S. PATENT DOCUMENTS 3,478,316 11/1969 Block .................................. 235/385
4,264,396 4/1981 Stewart ........................... 235/385 X Primary Examiner—Harold I. Pitts
Attorney, Agent, or Firm—Steele, Gould & Fried

[57] ABSTRACT

An inventory control and reporting system especially for retail drycleaners includes a data input keyboard having key blocks corresponding to information for identification and calculation of processing costs of laundry articles to be cleaned, a data processor adapted to calculate pricing information and to generate reports based upon such data input, the processor being connected to a printer and the processor and printer producing sequential multiple part bar code records and tags for attachment to the laundry articles in sequential transactions, and also as hard copies for the customer and for the establishment. The bar code portions of the records are generated by a dot matrix printer operating in a high resolution mode, the bar code portions being generated for a transaction contemporaneously with the transaction. The bar code tags are attached to articles of clothing and are used with scanning apparatus to facilitate generation of reports according to various management needs.

13 Claims, 4 Drawing Figures

INVENTORY CONTROL AND REPORTING SYSTEM FOR DRYCLEANING STORES

BACKGROUND OF THE INVENTION

1. Field of the Invention

This invention relates to inventory control devices capable of monitoring and reporting upon the status, location and throughput of inventory in an establishment. More particularly, the invention relates to such a system especially adapted to the peculiar needs of drycleaning establishments.

2. Description of the Prior Art

A basic function of inventory control is the counting of incoming and outgoing materials, and keeping a running total. In some situations, the identity of specific articles must be monitored, making inventory control somewhat more complicated. Automation in marking, sensing and routing can present enormous cost savings over manual operations for such establishments. Although the user is always subject to equipment failure, every step at which manual functioning and decision making can be eliminated likewise avoids time loss, errors, and various losses associated with human operation.

An inventory control system particularly adapted for a drycleaning store has many needs in common with the usual merchandise distribution warehouse system. Furthermore, the relatively low cost of individual transactions and cleaning operations aggravates the need to cut costs. In general, the possible revenue to be gained by processing a single article is quite small in comparison to the possible dissatisfaction which could be generated with consumers by even small percentage losses of articles and the like.

The usefulness of automated apparatus for information and process control has further benefits. Most efficient operation of a drycleaning store may require that the articles be optimally divided into batches of similar attributes which may be processed as units. For example, all articles of a given type of fabric may be best processed under certain conditions of cleaning fluid type, temperature, and the like. The operator (or his supplier) can clean the largest number of articles at the least expense by most efficiently allocating his machines and materials to reflect the particular mix of supplies being presented by the customers.

Various systems of lot accumulation, inventory reporting and other such inventory control and operation systems are known in the art. Automated systems in which digital computers are employed for counting purposes are known in connection with laundry systems. An example of such a system is shown in Wesner U.S. Pat. No. 3,876,075. In that device, customer identification and sorted article counts are processed by computer in order to assist in the allocation of lots to machines. The Wesner patent is primarily concerned with counting the articles.

In more general inventory control systems, further sophistication is known. In Block, et al., U.S. Pat. No. 3,478,316 inventory control in connection with a laundry or retail establishment is assisted by use of automatically-scannable tags attached to articles of clothing. The tags are scanned upon delivery of articles, whereupon the inventory count is adjusted. Block, et al., teach the usefulness of automation in laundry systems to assist in detecting dishonest clerks.

In connection with laundry systems, it has been common practice to apply a unique tag to a unit of laundry. The tag may have an alpha numeric (person-readable) indication and be merely stapled to a hem of an article of clothing. A different or more complicated indicia may also be attached to a hanger or the like, upon which the article of clothing is suspended. In any event, some form of code is needed for each article. The aforesaid patent to Block, et al., appears to involve magnetically-readable indicia.

In Glass U.S. Pat. No. 4,340,810 optically-readable indicia and alpha numeric indicia are combined in a single tag or unit for a general warehouse inventory control system. Automatic optical scanning equipment can be employed to form at least a part of the data input apparatus and, persons can verify the accuracy of processing by reviewing the alpha numeric data. Similarly, machine-readable information can be placed on the same tag with information to be read during manual distribution, for example, by the ultimate delivery person or the like. Such warehouse control systems are used to assign and operate upon article identifiers such as delivery route, day, stop, man and article number.

As disclosed in the patent to Glass, a number of printing and optical detection systems have been developed. Some systems have been developed for automatic recognition of alpha numeric characters, but it has been found that the most dependable of automatic scanning devices are not systems which rely on conventional alpha numeric characters. Instead, the least error prone and fastest automatic scanners rely upon codes generated from a coded sequence of parallel bars ("bar codes"). The bar codes are not easily decoded by humans.

The present invention is adapted to most efficiently apply a minimum of manual data input to an inventory control system especially adapted to a retail (i.e., customer-interfacing) drycleaning operation. A minimum of data is manually entered by an attendant via a keyboard having a series of keys which are uniquely intended to encode information which is peculiar to laundry operations, using a prescribed sequence and a minimum of keystrokes. The necessary data for reconciling the intake of articles and cash against inventory is provided using a particular input protocol. Article identification, customer identification, and descriptions needed for generation of cost and pricing reports are entered, and the articles to be cleaned are associated with a unique bar code indicia for later automatic or semi-automatic optical scanning and data input, whereby the progress of articles through the laundry and drycleaning system can be completely monitored.

Positive cross reference of bar codes and articles upon entry into the system, under machine control, provides optimum capability of reconciling articles, cash and inventory.

The use of written indicia bearing an automatically-scannable bar code has been known in the art, and in connection with laundries. Companies producing business forms are currently supplying forms provided with a pre-printed bar code which may be optically scanned. These supplied multiple part forms, for example a three-part receipt form having carbon paper or other multi-part impression material, are sold in sequentially-numbered supplies with a pre-printed bar code such that one or more of the forms may be associated with the laundry for later scanning.

Parts of multiple-part forms, for example, those saved for hard copies for the laundry management and the copy given to the customer as a receipt, need not be provided with bar codes. In order to identify a single customer or transaction with a single bar code, however, all the articles which that customer presents at the laundry must be somehow associated together, using an automatically optically scannable code to facilitate automatic reconciliation.

Inasmuch as the known pre-printed bar-coded forms are supplied rather than produced internally, the bar code itself must be read into the system, or a sequence number entered manually. The use of pre-printed bar code indicia can become somewhat expensive, in cost of pre-printed forms as well as time spent in using them.

Many product labels bear bar codes for product identification, which codes are predetermined for the product, and do not change from label to label. Production of unique codes for each successive label is much more difficult. A custom pre-printed bar coded form may appear to be a simple printed indicia, but the bar code is unique. While the forms may be simply printed except for the bar code, the bar code must be printed by a sophisticated automatically-advancing type printing press, generating unique bar codes. Therefore, unique printed bar codes are expensive.

In a situation in which a certain number of bar coded form parts are required, for example, one each for management, the customer and a batch container for a customer's laundry articles, the cost of pre-printed bar code labels increases. The increase may be less than proportional, but even given the relatively smaller cost per bar code of pre-printing a label having a number of bar code repetitions, the present invention reduces the cost of such pre-printed indicia even further, and allows use of a variable number of bar code repetitions. One of the greatest savings of the invention is not the cost of the indicia but the fact that the indicia cannot be lost. The automatic production of labels at the point of sale precludes the possibility that even the most automatic of inventory control systems will be defeated by unaccountable loss of pre-printed labels.

The present invention concerns a way of printing a set of bar code labels coincidentally with the individual transaction. Accordingly, there is no possible loss of labels, and therefore a much smaller possibility that unrecorded and unaccountable transactions can be performed by an attendant. The throughput and the inventory can always be reconciled with the cash. The system is programmed such that data is entered for a given unique transaction, and a unique code is produced concurrently. Only a preferred terminal can void a transaction or otherwise disregard a unique identifying code. Therefore, the possibility of pilferage is minimized.

The system of the invention uses a dot matrix printer to generate bar codes. The processor controls the code produced and the reconciliation thereof. High-quality bar codes are preferably generated in a high resolution mode of printing using the dot matrix printer. Inasmuch as preparation of truly high resolution bar codes may require several seconds using even a relatively high-speed dot matrix printer, according to the system of the invention, printing of bar codes for a transaction commences on the first keystroke, whereby the unique indicia and the articles become closely associated. The indicia may also be printed following the completion of a preceding transaction.

According to the invention, the optical scanning dependability of a bar code system is achieved in the same system which avoids the usual expense of multiple repetitions of such bar code tags. Moreover, the system and its operators are made truly accountable for each transaction and the indicia thereof. The added advantages do not impede the system. Data entry, article marking, optical detection of bar codes associated with articles, reconciliation capabilities, and all the benefits of fully automated inventory control and report generation are realized.

SUMMARY OF THE INVENTION

It is an object of the invention to specifically adapt an automated inventory control system to the particular needs of a retail drycleaning establishment.

It is also an object of the invention to employ automatically scanned bar code labels in a drycleaning establishment, the bar code labels being produced only under machine control and only upon need therefor.

It is another object of the invention to maximize accountability and automated control of inventory and management reporting capability, while minimizing the expense of supporting the system.

It is yet another object of the invention to facilitate data entry, inventory control and reporting by providing the greatest capability at the least cost.

These and other objects are accomplished by an inventory control and reporting system for drycleaners which includes a data input keyboard having key blocks corresponding to certain information needed for identification and calculation of processing costs of articles, a data processor adapted to calculate pricing information and to generate reports based upon such data input, the processor being connected to a printer for producing multiple part bar code records and tags to be associated with the laundry articles, and also as hard copies for the customer and for the establishment. The bar code portions of the records are generated by a dot matrix printer operating in a high resolution mode, the bar code portions being generated for a successive transaction immediately upon completion of a preceding transaction. The bar code tags may be attached to articles of clothing and/or batches thereof, for use with scanning apparatus to facilitate generation of reports according to various management needs.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
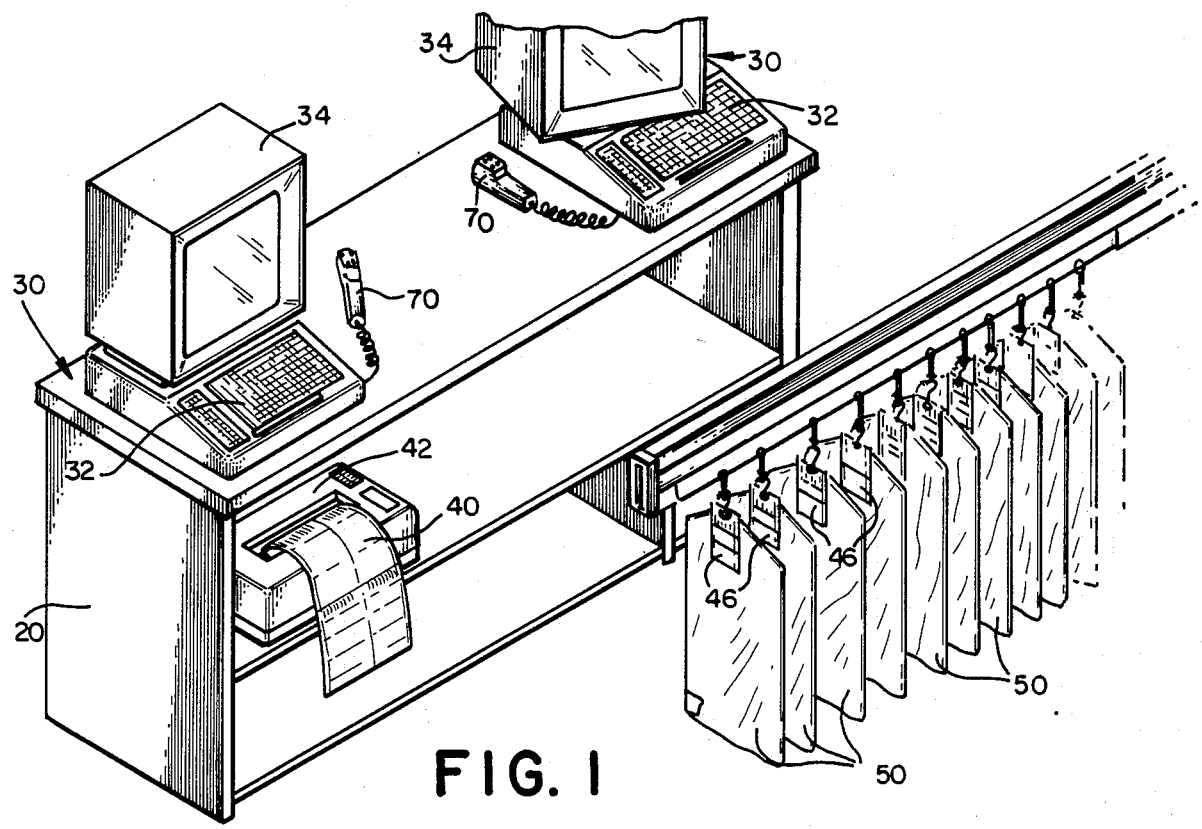
FIG. 1 is a schematic elevation view of a customer data entry station according to the invention.

The inventory control system of the invention requires the input of information together with the input of items to be placed in inventory, the information and the items to be uniquely positively associated with one another throughout processing. Every transaction is recorded, including identification of the articles placed in inventory. The more complete the information input and associated with each article, the better the possible reporting power of the system.

The present system is applicable to a range of embodiments of varying complexity. The best inventory control and management information reporting systems has the ability to determine and report the current location of any given article in inventory. The system should also be able to reconcile the inventory against the cash on hand, or as having finished processing through a certain area of the plant. According to the present invention, initial data input is minimized, and later logging of inventory articles, for example, passing stations within the system, or passing out of the system, is accomplished by means of an automatic optical scanner.

The optical scanning reads unique bar codes associated with articles or batches thereof. It is possible to have a full supply of sequentially numbered bar code tags available for use, but such a system cannot be fully reconciled due to the unaccountable loss of any of the pre-prepared tags. A lost tag, without any means of determining how the tag was lost, whether the tag had represented a transaction, or who was responsible, presents the possibility of proceeds diverted or articles lost. In connection with laundry and drycleaning establishments, in which relatively unskilled personnel having little commitment to the business are employed as attendants, it has been an occasional problem that attendant personnel will service a customer's requirements and pocket the proceeds. The customer may receive his cleaning without complaint, and all paperwork being unaccountably lost, it is difficult or impossible to locate the loss of profits or to meaningfully deter such activities.

Cost saving opportunities upon full data entry may be found at virtually all stages of processing throughout the business to be monitored by the data processing system. Given the relevant data, management information can be developed in the form of statistics about various sub-operations within the overall system. These statistics reveal opportunities for cost-savings or improvements in efficiency. For example, with minimal input and attention to the processing and location of specific articles, it may be possible to determine whether cyclical variations in throughput can be balanced to enable operation with less equipment or personnel. It may also be possible to determine whether a problem which appears to occur randomly in the inventory (e.g., damage to garments) can be uniquely associated with a certain piece of equipment or the like, which piece of equipment may need repair. These are only a few of many possible gains from full data input and reporting. The present system facilitates both accountability and ease of data input, and uses hardware capable of sophisticated reports as well.

By generating the unique indicia associated with transactions, the invention removes the control step of associating a sequentially-numbered ticket with a transaction. The possibility of phantom transactions in which the attendant processes articles without tickets, or uses a ticket without entering data, is precluded. Accordingly, article identification, accumulating lost for processing, and the general ability to reconcile system operations, are improved and made dependable.

In FIG. 1, incoming articles to be placed in inventory are accumulated over a counter 20, having one or more data input and display terminals 30. Written records 40 are produce, and may be attached to garments 50 as they move through the processing system. At at plurality of locations throughout the system, optical scanning devices automatically, or semi-automatically read codes placed on the written records attached to laundry articles in the area, whereby reports of desired complexity may be generated.

When a customer brings incoming laundry to counter 20, an attendant enters identifying information on terminal 30 by means of keyboard 32. The keyboard is discussed more fully hereinafter. At least information as to the customer's identity is required, together with information as to the type of articles being deposited and the particular operations, such as drycleaning, to be performed on the articles. This information is manually entered on a data input device especially adapted for drycleaning operations, and is stored in the system memory.

A data processing device such as a digital computer processes and stores the data entered by keystrokes at keyboard 32, and displays information as required on CRT terminal 34. The processor is programmed to associate sequential customers and/or transactions with a unique indicia, generally a number, whereby the customer and/or transaction number can later be used to call up information associated with it. This information is used to generate managemant information reports, or at the least to accumulate and report transactions and/or totals such as the proceeds collected by the attendant.

The data processor may be located under the counter, or otherwise conveniently located throughout the establishment and connected to the remaining system elements by means of any convenient data link. In close physical proximity to the attendant's station is a printer 42, for generating a hard copy 40. The printer is operable under control of the data processing device to generate written records reflecting the stored records entered on the input device and associated with particular customers and transactions. The written records have several uses, including providing a receipt for the customer, providing a hard copy for use by management, and providing a mark for attachment to individual articles in inventory, or for a group of articles in inventory. In this manner, the articles can be associated with the customers and with the transactions as well.

The written record includes a plurality of optically detectable bar codes, each having a series of contrasting spaced bands in different widths, which bands may be decoded as a unique indicia. The bar codes are themselves printed directly by the printer, rather than being provided as an element in a supply of pre-printed forms. The bar code records are printed sequentially as sequential customer transactions occur. Therefore, forms cannot be unaccountably lost. The transaction is necessarily entered. The processing system is adapted such that transactions cannot proceed until dispositive action is taken with each customer and with the written record generated by the system.

Coincident printing of bar codes on the written records with the appearance of each customer and transaction, as required by the invention, presents certain time constraints to operation of the system. If a customer has a simple transaction such as a single article to be cleaned in a standard way, the time during which the customer is serviced may approach the time required to produce a bar code record of sufficient resolution to be dependably read by conventional optical readers. In any event, the customer need not be required to wait until a preceding customer's paperwork is completed before his transaction can be processed.

According to the invention, a printer capable of dot matrix printing in two modes is used. The printer is adapted for alpha numeric printing at high speed and relatively low resolution in one mode, and also adapted for printing in a "graphics" mode at much lower speeds but higher resolution. Of course, the difference in modes can be a matter of processor "mode" as well. An example of a dual mode printer is identified as model Microline 82A produced by the Okidata Company of Mount Laurel, N.J.

Operating the printer in the high resolution graphics mode, the system according to the invention is adapted to commence printing all the high resolution bar code characters required for a transaction immediately upon the first keystroke thereof. Alternatively, the code can be printed at the conclusion of a preceding transaction. By this method, time spent before or during customer contact is used to prepare the necessary bar graphed code tags. The customer never perceives any great delay, and high resolution bar code characters are generated without resort to expensive (and often unaccountable) bar coded stationery supplies.

Figure 2:
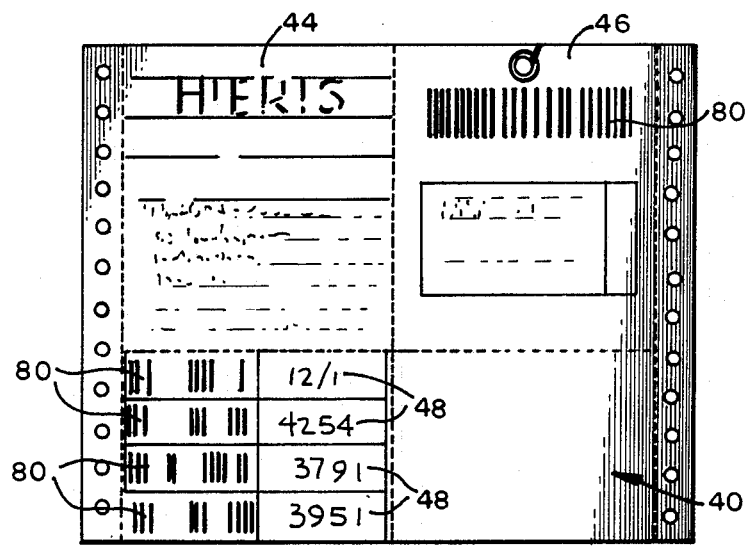
FIG. 2 is an illustration of a sequential custom-printed, bar-coded tag and receipt set according to the invention.

Unlike the conventional laundry operating system in which pre-printed alpha numeric character labels (i.e., using Arabic numerals and letters) are attached to articles or containers for articles in inventory, according to the invention custom-printed bar code labels are used. Automatic scanning devices can be used to directly read the bar codes from items in inventory. An example of a preferred transaction label is shown in FIG. 2. With reference to FIG. 2, a multi-part form 40 preferably comprises a customer's ticket copy 44, an establishment ticket copy 46, including a bar code and a plurality of article tags 48, each article tag including both a bar code and a person-discernable alpha numeric character.

Figure 4:
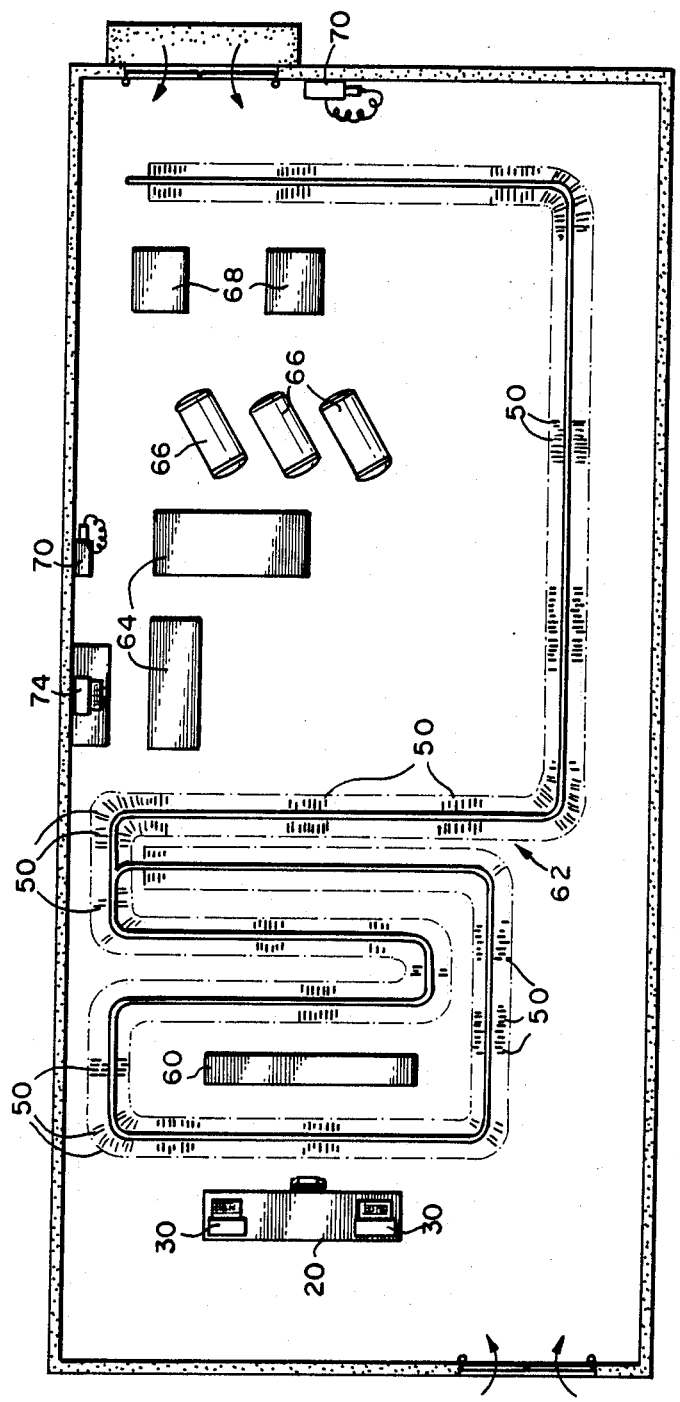
FIG. 4 is a schematic plan view showing steps in a typical drycleaning operation according to the invention.

The layout of a hypothetical retail drycleaners is shown in FIG. 4. It will be appreciated that a variety of possible business structures and physical layouts will benefit from the system of the invention. For purposes of discussion, an establishment is shown having a customer service counter 20, separated from the article-processing area by wall 60. A track 62 stores and transports packages of articles, and may define a closed circuit. Article presorting stations 64, cleaning apparatus 66 and assembly stations 68 are sequentially passed by articles processed.

In many drycleaning businesses, the customer service areas are remote from the article processing areas, the service areas being only for collection and delivery of articles. The invention is applicable in either local or remote processing systems.

The system relies upon the bar code indicia 80, attached to or associated with articles or batches, and "read" using optical detector devices 70. Detectors 70 are located at various points in the system, including at least the customer service stations. The attendant need only scan the tags 48 bearing bar codes 80 to dependably and quickly log an article or batch through a station. The tags 48 and bar codes 80 are originally generated together with the customer ticket 44 and establishment hard copy ticket 46, upon receiving the articles from the customer.

The alpha numeric tags 48 are detached from form 40, printed on the spot, and attached to drycleaning items 50, as shown in FIG. 1. Individual article tags 48 may be attached to items in inventory, as is known in connection with pre-printed alpha numeric labels. In addition, a copy of the customer's ticket, for example, the establishment ticket copy 46, can be attached to a hanger or batch bundle or other unitary package containing a plurality of individual articles. The machine control of bar code generation can be further used to handle batch coding of packages containing articles from multiple customers and the like.

Figure 3:
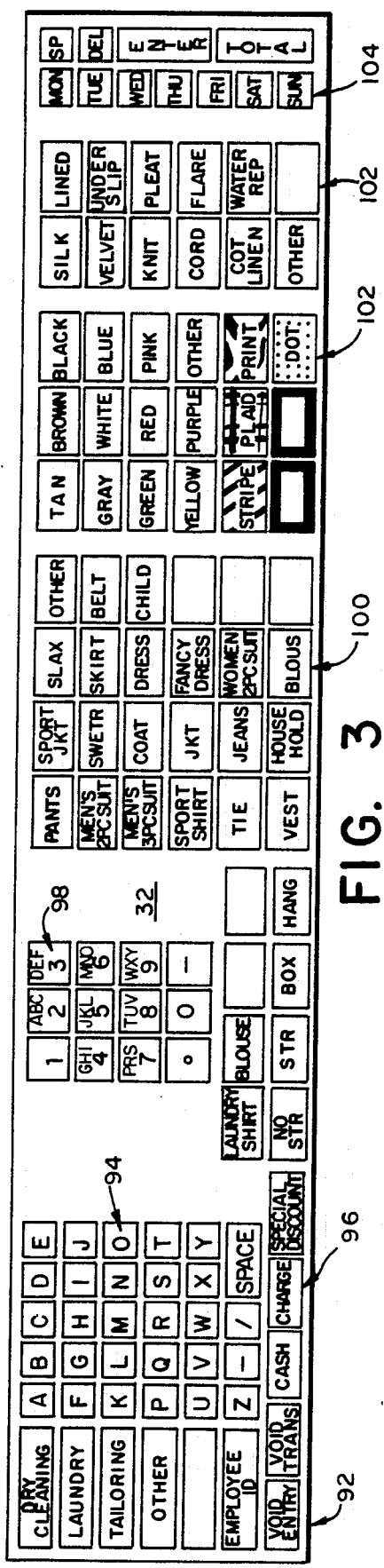
FIG. 3 is an elevation view of the blocked custom keyboard of the invention.

The association of a bar code and an article or group of articles is only one portion of the larger inventory control system. The garment tags and customer tickets associate a unique indicia with transactions, persons and physical items in inventory; however, an inventory control system may also require a great deal of additional information to be associated with the articles, in order to provide all the possible savings of costs and all the appropriate information and reports. The data entry keyboard 32 of the invention, as shown in FIG. 3, is specifically adapted for entering information relating to retail drycleaning establishments. The specific adaptation is based upon groupings of switch pads, each grouping relating to a specific and important piece of information.

Keyboard 32 is laid out such that the operator can progress from left to right (or top to bottom, etc.), making one or more selections from each of the grouped blocks of switch pads. The switches themselves may be pushbuttons, for example, of the type used for typewriters and the like, or alternatively, a switch membrane can be advantageously used. If desired, data entry can be prompted by back-lighting the next sequential block (or blocks) of switch pads, unde, processor control. According to the preferred layout, as shown in FIG. 3, the attendant progresses from left to right, entering in order: the type of laundry (at area 92); one or more words or names to be associated with the customer (at letter block 94); the type of transaction (block 96); the number (block 98) and type (block 100) of articles and descriptions (blocks 102) the colors and fabrics thereof; and, the date of required completion (block 104). These pieces of information are used not only to record the transaction, but also to immediately calculate the price to be charged the customer, and also to feed forward information to assist in planning the scheduling or batching to be processed in various laundry handling machines.

The price to be charged can be calculated based upon a calculation using relative cost factors such as the fabric type, color and delivery requirements, or a complete look-up table of particular prices can be stored in the data processor's memory for consultation based upon a matrix defined by the particular switches operated.

The keyboard includes buttons for at least several of the most common choices in each category. Preferably, the layout of choices within any keyboard is such that the most common choices are the most accessible, for example the upper left. A miscellaneous key for choices which are not found may also be included. The miscellaneous key calls up a menu for the attendant to select further choices via programmed data entry rather than by choice of key. For example, upon the attendant's entry of a "fancy dress" selection, a menu is output to the CRT for further identification, e.g., "wedding". In the event that no appropriate selection can be found, a default entry of text may be made via the letter section of the keyboard.

Having entered a complete series of selections corresponding to the customer, article and job description, the attendant signals completion by operating the "Enter" or "Total" keys, whereupon the data processing system summarizes, prints or otherwise makes use of the information, as required for example to calculate pricing. The summarized customer or transaction information is printed on the hard copy ticket, the system printing in a high-speed low resolution mode, instead of the high resolution mode adapted for printing bar codes.

It will be appreciated that the uses to be made of the information, and also the reports which can be generated by taking further information regarding the current locations of articles within the system, will vary as widely as the physical descriptions and desires of drycleaning establishments. An example of a typical establishment, for purposes of discussion, is illustrated in plan in FIG. 4. The establishment includes the counter at which customers are serviced, the counter having an article transportation mechanism 70 associated therewith. The customer service station is known in more detail in FIG. 1; however, the tickets are there generated and associated with articles which may be sorted, cleaned in batches, and re-sorted into individual customer packages in the same establishment. Alternatively, as is perhaps more common, the individual retail drycleaning establishments are merely collection points for articles to be actually processed at a larger establishment. Remote processing systems have an even greater need for inventory control and automatic scanning of article containers and the like. The various areas shown in FIG. 4 could be near or far apart. At some point before processing, the articles to be cleaned must be sorted into groups of articles which may be appropriately processed together. After processing the articles are unsorted back into single customer or transaction packages. Both upon sorting, upon unsorting, and at any point in the actual cleaning process, it may be necessary or desirable to determine what particular articles or number of articles are located at a particular processing point. In this respect, each unique number or code or other indicia associated with an article, or with a transaction, remains "alive" until processing of all the articles is completed, and delivered to the customer together. Therefore, the inventory can be reconciled at any point in the sequence.

Upon sorting or unsorting the batches, for example at sorting stations 74, optical scanning apparatus 76 inputs data to reconcile the inventory with the expected inventory. Any loss of articles or errors in entering data can be immediately reported, before the physical association of articles from a given customer is lost. Also at this time, any physical damage which is noticed by the sorter can be entered on the system, for example by pushbutton, against the possibility that the establishment will be held responsible for articles which arrive damaged. A complete description of the damage may be entered using a more sophisticated station 74, for example including a blocked-switchpad (not shown) having a plurality of possible descriptions of a sort similar to the customer terminal keyboard 32.

After processing, optical detection of bar codes is again useful to permit the reorganization of articles into customer packages. Further programming may also be used in order to assist in sorting, for example, upon optical detection of a bar code, the data processing system could be adapted to indicate which of a plurality of packages was to include that article. Similarly, reconciliation of a customer package contents can be promptly indicated. In any event, the automatic association of articles within a transaction is one possible form of management information report. Alternative reports may include reports relating to through-put, machine loads, operator efficiencies, and the like.

Optical scanners capable of discerning bar codes are available from various companies. A popular device employing such apparatus is known as a "wand." Although various such devices for hand-held operation are usable, examples are the "Laser Scanner" portable bar code scanning system merketed by MSI Data Corporation, and the "Datawand," also merketed by that corporation. These devices may be peripheral data input devices, or may include local storage for later downloading to the central processor.

The apparatus according to the invention is preferably outfitted with various additional hardware elements adapted to point-of-sale terminals and the like. Processor-interfaced cash drawers, CRT monitors and the like are all appropriate for the general system disclosed.

The possibilities for management information reporting according to the present system are substantial. Of course, the full capabilities need not be provided for all establishments, and if provided need not be consulted at all times. Should the user so desire, the basic capabilities of inventory input and output logging, together with price calculation can be used constantly. Full management information can be supported, with added data entry, only when need is perceived to isolate a problem or to attempt an improvement in overall efficiency.

The invention having been disclosed, a number of further variations will now be apparent to persons skilled in the art. Reference should be made to the appended claims rather than the foregoing specification as indicating the true scope of the subject invention.

What is claimed is:

1. The inventory control and reporting system, comprising:

a data input device for manual operation by an attendant, the input device having switch means operable to encode information relating to sequential transactions, each of the transactions having articles associated therewith, said information including transaction identity and descriptions of each of said articles associated with the transactions;

a data processor including memory operable to record said information and means to maintain an inventory total, said data processor having means to associate sequential transactions with unique sequential indicia and to generate at least one report of said total and said transactions, the unique sequential indicia and the descriptions of articles in the sequential transactions being reconcilable against one another;

a dot matrix printer operable under control of the data processor to generate a written record of the indicia associated with sequential transactions, the written record including optically-detectable bar codes having a series of contrasting spaced bands, the bar codes being printed only in coincidence with each said transaction and at least part of the written record bearing a portion to be attached to said articles; and, at least one optical scanner connected to the data processor and operable to detect said bar codes on all articles passing a predetermined station, whereby said system can detect and localize spurious additions to inventory as well as spurious deletions therefrom.

2. The system of claim 1, wherein the written record comprises further indicia in addition to the bar codes, wherein the bar codes for a given transaction are automatically generated by the data processor and printer immediately upon commencement of an entry for the given transaction, and all unique sequential indicia generated are associated with sequential transactions, thereby preventing entry of unaccountable articles into inventory due to association of said unaccountable articles with spurious written records.

3. The system of claim 2, wherein the further indicia comprises alpha-numeric indicia also reflecting information, the information relating to the sequential transactions, for verifying system operations.

4. The system of claim 3, wherein the printer is adapted to print in a higher resolution mode for printing the bar codes upon said commencement, and in a higher speed mode, for printing the further indicia upon completion of said manual operation.

5. The system of claim 1, wherein the written record has multiple separable parts printed concurrently, including a customer ticket, an establishment ticket and a plurality of article taps, at least one of the tickets and tags having a bar code printed thereon, and each tag being detachable from the written record for direct association with at least one of the customer articles.

6. The system of claim 1, wherein the data input device is a keyboard and the printer is operable to generate tags for direct attachment to articles comprising textile material, the articles being pieces of drycleaning.

7. The system of claim 1 adapted for specific use in a retail drycleaning establishment, the articles being articles to be cleaned, and comprising additional optical scanners at a plurality of stations along a sequence of retail drycleaning operations including sorting, cleaning and delivery, the indicia and the descriptions of articles being reconcilable at each of said plurality stations for localizing said spurious additions and deletions.

8. The system of claim 1, further comprising a preferred input means connected to the data processor, the preferred input means and the data processor interacting for preparation of the reports.

9. The system of claim 8, wherein only the preferred input means is capable of voiding a transaction having a unique sequential indicia associated therewith, and cancelling a written record thereof.

10. The system of claim 1, wherein the input device is a keyboard having alpha-numeric keys, and also having keys specific to a plurality of common attributes of the articles and common optional attributes of the sequential transactions, said common attributes being recorded using single key strokes.

11. The system of claim 10, adapted for use in a retail drycleaning operation, the articles being articles to be cleaned and the common attributes including articles types, colors, patterns, fabrics, special requirements and delivery requirements.

12. The system of claim 11, wherein a plurality of the keys correspond to attributes of the articles affecting the costs of processing thereof, the data processor being adapted to calculate pricing information based upon input from the keys.

13. The system of claim 12, wherein the input device futher comprises keys specific to customer timing requirements affecting the cost of processing the articles, the data processor calculating costs based upon input from the keys.

* * * * *